Patented Oct. 26, 1943

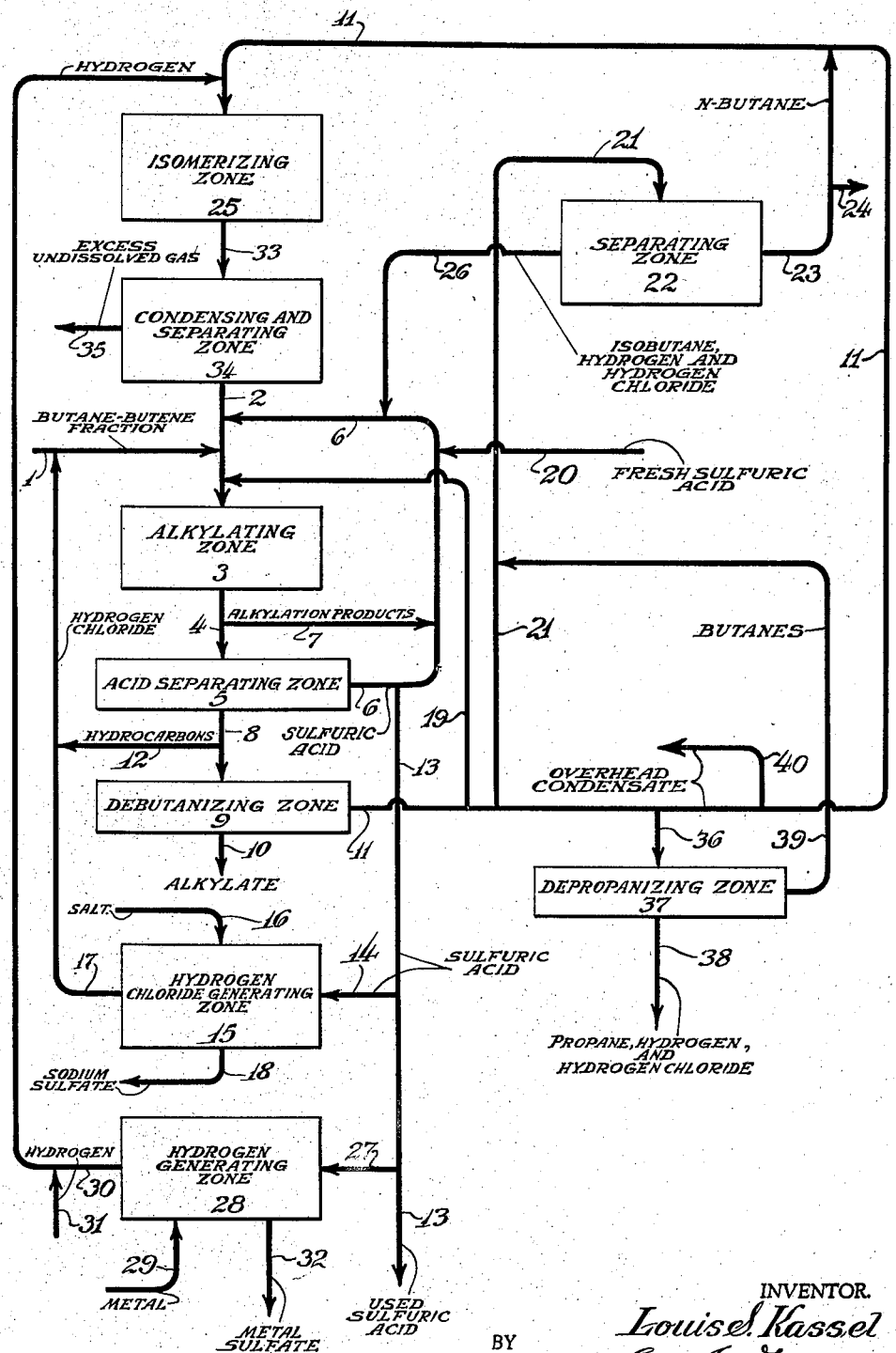

2,332,577

UNITED STATES PATENT OFFICE

2,332,577

TREATMENT OF HYDROCARBONS

Louis S. Kassel, Chicago, Ill., assignor to Universal Oil Products Company, Chicago, Ill., a corporation of Delaware Application November 8, 1940, Serial No. 364,763

7 Claims. (Cl. 260—683.4)

This invention relates to a process for producing substantially saturated gasoline of high antiknock value from paraffins and olefins.

More specifically the invention is concerned with a combination process comprising catalytic isomerization of normal butane to isobutane in the presence of an aluminum chloride-containing catalyst, hydrogen chloride, and a permanent gas, followed by alkylation of isobutane by butenes in the presence of sulfuric acid.

In one specific embodiment the present invention comprises a process for producing substantially saturated hydrocarbon fractions of gasoline boiling range and high antiknock value which comprises commingling a butane-butene fraction with a fraction formed in the process and containing isobutane, hydrogen, and hydrogen chloride; subjecting the commingled mixture to alkylation in the presence of sulfuric acid to form an alkylation product; separating said product into a mixture and used sulfuric acid; fractionating said mixture into a substantially saturated alkylate and an unconverted fraction comprising essentially butanes, small amounts of lower boiling paraffins, hydrogen, and hydrogen chloride; recycling a portion of said unconverted fraction to mix with the commingled mixture being subjected to alkylation; subjecting a second portion of said unconverted fraction to separation to separate hydrocarbons boiling lower than butanes from a substantially butane mixture; subjecting to a further separation said substantially butane mixture in admixture with a third portion of said unconverted fraction comprising essentially butanes, small amounts of lower boiling paraffins, hydrogen, and hydrogen chloride to separate normal butane from isobutane, small amounts of lower boiling paraffins, hydrogen chloride, and hydrogen; withdrawing a portion of said normal butane from the system; conducting the remainder of said normal butane and the remainder of said unconverted fraction to contact with an isomerizing catalyst in the presence of hydrogen and/or hydrogen chloride produced in the process or introduced from an outside source to form a mixture containing a substantial proportion of isobutane; cooling and condensing said mixture without substantial reduction of pressure in order to substantially dissolve hydrogen chloride and hydrogen in the condensed butanes; combining said mixture with the isobutane fraction described above; and conducting the resulting mixture and an added butane-butene fraction to said alkylation in the presence of sulfuric acid.

The combination process of the present invention is particularly advantageous on account of its relatively small fractionation requirements and the simplified method by which the hydrogen chloride used in isomerization is recovered and recycled. The process will be described with particular reference to isomerization of normal butane to isobutane by aluminum chloride catalysts in the presence of hydrogen chloride and hydrogen and to alkylation of isobutane by butenes but it is applicable also to the isomerization of other normal and mildly branched chain paraffin hydrocarbons including n-pentane, hexanes, and higher paraffins, and to the alkylation of the resulting branched chain paraffin hydrocarbons with normally gaseous and liquid olefins in the presence of catalysts as hereinafter set forth.

Isomerization of normal butane may be effected by contacting this hydrocarbon in the presence of hydrogen chloride with a granular composite comprising substantially anhydrous aluminum chloride or a mixture of substantially anhydrous aluminum chloride with a chloride of iron, copper, zinc, or zirconium preferably supported by a granular carrier such as activated carbon, pumice, various types of fullers earth and clays, particularly those of the montmorillonite and bentonite types either raw or acid treated, diatomaceous earth, a silica-alumina composite, unglazed porcelain, fire-brick, and in general refractory porous substances which have substantially no chemical reactivity with aluminum chloride, iron chloride, copper chloride, zinc chloride, and/or zirconium chloride.

In the presence of such composite catalysts normal butane may be converted into approximately 30-60% isobutane per pass when utilizing a temperature in the approximate range of 100-650° F., and preferably under a pressure in the range of substantially atmospheric to approximately 3000 pounds per square inch and preferably in the range of 50-1000 pounds per square inch. While inert gases, such as nitrogen, may sometimes be employed alternatively in producing the necessary pressure, experiments have shown that hydrogen is preferable, as its presence in an amount between about 0.5 and 2.0 mole per cent of the hydrocarbons present seems to minimize undesirable side reactions involving decomposition rather than the desired isomerization.

There are several alternative catalysts comprising aluminum chloride or mixtures of aluminum chloride with chlorides of iron, copper, zinc, or zirconium supported on inert carrying materials which may be employed to effect the isomerization step of the present invention. While many of these carrying materials may be used more or less interchangeably, some are more effective than others and it is not intended to imply that all carriers are definitely equivalent. Also, it frequently happens that one type of carrier or support is better for use with a given catalyst containing metal chlorides, depending upon the ratio of metal chlorides to support found experimentally to be best for the furtherance of the butane or paraffin isomerizing reaction. Accordingly, it is not to be implied that the supports can at all times be used interchangeably. Extensive experiments have indicated that best results are obtained when a minor percentage of hydrogen chloride is present in the reaction and this necessary amount of hydrogen chloride, generally from approximately 0.5 to 20% by weight of the paraffin charged, may be introduced directly from an outside source or produced in the system as by the action of used sulfuric acid upon salt.

The products withdrawn from the isomerization step containing hydrogen chloride, hydrogen, normal butane, isobutane, and also minor amounts of methane, ethane, propane, and pentanes may be cooled to liquefy the butanes and to dissolve therein desired proportions of hydrogen and hydrogen chloride. Gases which remain undissolved may be discharged and the liquefied material may be commingled with a butene-containing fraction and then conducted to alkylation in the presence of sulfuric acid which may comprise a mixture of fresh acid and recycled acid previously used in the process. The addition of the butene-containing fraction is preferably so controlled that the olefin content of the commingled mixture does not exceed approximately 10% of the isoparaffin hydrocarbons being conducted to alkylation.

Alkylation of isobutane and of other isoparaffins by olefins and particularly by normally gaseous olefins as, for example, butenes, may be effected in the presence of sulfuric acid of approximately 90–100% or higher concentration at a temperature in the approximate range of −15 to 200° F. under a pressure sufficient to maintain substantially liquid phase operation and generally at a pressure in the range of from substantially atmospheric to approximately 1000 pounds per square inch. It is preferable that mixtures being subjected to alkylation contain a molal excess of the isoparaffin in order to substantially prevent polymerization and to keep the alkylating catalyst active for a relatively long period of time. Good yields of substantially saturated alkylation products are generally obtained when employing, for example, from approximately 4 to 15 or more molecular proportions of isoparaffin per molecular proportion of olefin present in the mixture being subjected to alkylation.

The use of a combination of butane or paraffin isomerization and alkylation, according to the process of this invention, has the advantage that saturated gasoline of high octane number may be produced without the necessity of hydrogenation which is inherent in the formation of gasoline, which may be used for aviation purposes, by previously used processes involving dehydrogenation of butane, polymerization of the resultant butenes to iso-octenes, and hydrogenation of the iso-octenes to iso-octanes.

The isomerizing and alkylating catalysts hereinabove described which may be used for effecting these respective reactions are not necessarily equivalent in their actions and the conditions of temperature, pressure, and time employed for any given isomerization or alkylation reaction are determined by the catalyst, the hydrocarbons involved, the composition of the reaction mixture, and by other factors.

For the purpose of illustrating the combination of steps characteristic of the present invention, the accompanying drawing shows diagrammatically means embodying one specific process flow utilizable for producing gasoline of high octane number from a butane-butene fraction.

Referring to the drawing, a butane-butene fraction separated from products obtained in petroleum cracking, in dehydrogenation of butane, or from any other source, is introduced through line 1 to line 2, therein commingled with a fraction containing isobutane, hydrogen, and hydrogen chloride and obtained in the process as hereinafter set forth, and the commingled mixture is then introduced to alkylating zone 3 containing sulfuric acid as alkylating catalyst.

Alkylating zone 3 comprises a suitable reactor provided with adequate means for mixing, heating, and/or cooling to maintain a desired operating temperature generally in the approximate range of −15 to 200° F. This operation is effected under sufficient pressure that substantial proportions of the hydrogen and hydrogen chloride are kept in solution by the liquefied butanes. From alkylating zone 3 the products comprising essentially a substantially saturated alkylate, unconverted butanes, and used sulfuric acid are conducted therefrom through line 4 to acid separating zone 5 of suitable design for separating used sulfuric acid from a substantially saturated hydrocarbon fraction containing the alkylation product. Used sulfuric acid is withdrawn from acid separating zone 5 through line 6 and therein recycled to line 2, already mentioned, through which butanes and butenes are conducted to alkylation. When desired, a portion of the total alkylation product being discharged from alkylating zone 3 through line 4 may be conducted therefrom through line 7 to line 6 and then recycled to further alkylation treatment.

The hydrocarbon fraction separated in acid separating zone 5 is conducted therefrom through line 8 to debutanizing zone 9 which comprises fractional distilling equipment of adequate design by which a substantially saturated alkylate is separated as bottoms from an overhead condensate comprising essentially normal butane, isobutane, hydrogen, and hydrogen chloride. The substantially saturated alkylate is withdrawn from debutanizing zone 9 through line 10 to storage or to a subsequent fractionating treatment, not shown, to separate hydrocarbons of desired boiling range. The overhead condensate separated from the alkylate in debutanizing zone 9 is conducted therefrom through line 11 for further use as hereinafter set forth. When desired, a portion of the total alkylation product is conducted from line 8 through lines 12 and 17 to line 1 through which butanes and butenes are charged to alkylation.

A portion of the used sulfuric acid being withdrawn from acid separating zone 5 through line 6 is discharged from the system through line 13. Part of the used sulfuric acid being conducted through line 13 is passed through branch line 14 to hydrogen chloride-generating zone 15 to which salt is admitted through line 16. Hydrogen chloride resulting from the interaction of the used sulfuric acid and the added salt is conducted from hydrogen chloride-generating zone 15 through line 17 to line 1 in which the charged butane-butene fraction is conducted to alkylation. It is preferable to introduce the hydrogen chloride on the suction side of the pump by which the hydrocarbons are brought to the pressure used in alkylation which is generally in the approximate range of 50–1000 pounds per square inch although higher and lower pressures may be used also. The hydrogen chloride may also be introduced to the process preferably at some other suitable low pressure point of the system. The rate of addition of hydrogen chloride is controlled so as to make up for its unavoidable losses from the system. Sodium sulfate formed in hydrogen chloride generating zone 15 may be discharged therefrom through line 18.

A portion of the overhead condensate passing through line 11 as aforementioned and comprising essentially isobutane, normal butane, hydrogen chloride, and hydrogen is conducted through lines 19 and 2 to alkylating treatment in alkylating zone 3. Fresh sulfuric acid is introduced to the alkylating step of the process through line 20 to line 6 already mentioned.

A second portion of the overhead condensate passing through line 11 is conducted therefrom through line 21 to separating zone 22 which comprises fractional distilling equipment of adequate design for separating normal butane from a lower boiling fraction comprising essentially isobutane, hydrogen, and hydrogen chloride. The normal butane is directed from separating zone 22 through line 23 to line 11, already mentioned, and thence through a suitable preheater, not shown, to isomerizing zone 25. When desired, normal butane is discharged from line 23 through branch line 24 to storage or to other use. From separating zone 22 the fraction comprising essentially isobutane, hydrogen, and hydrogen chloride is conducted through lines 26, 6, and 2 to further alkylating treatment. A portion of the overhead condensate in line 11 may be directed to isomerization zone 25 together with the normal butane fraction produced in separating zone 22.

Isomerizing zone 25 comprises a reactor of suitable design containing as filler a composite of anhydrous aluminum chloride and a substantially inert carrier operated at a temperature within the approximate limits of 100° and 650° F. and under a pressure preferably between about 50 and about 1000 pounds per square inch although the pressure may range from substantially atmospheric to approximately 3000 pounds per square inch. The condensate being conducted to isomerizing zone 25 by means of line 11 is commingled therein with hydrogen introduced from an outside source or produced by the action upon a metal of a portion of the used sulfuric acid. For the latter purpose used sulfuric acid is conducted from line 13 through line 27 to hydrogen-generating zone 28 containing a metal such as iron or zinc introduced conveniently by way of line 29. Hydrogen so formed may be passed from hydrogen-generating zone 28 through line 30 to line 11, already mentioned, through which a mixture of butanes, hydrogen chloride, and hydrogen is being conducted to isomerizing zone 25. When desired, hydrogen from an outside source may be admitted through line 31 to line 30. Metal sulfate formed by the hydrogen-generating action in hydrogen-generating zone 28 may be discharged therefrom through line 32 to storage or to other use.

The mixture of isobutane, normal butane, hydrogen, and hydrogen chloride present in isomerizing zone 25 is conducted therefrom through line 33 to condensing and separating zone 34 which is preferably operated at approximately the isomerizing pressure in order that hydrogen and hydrogen chloride will dissolve substantially in the condensed butanes. When hydrogen and hydrogen chloride are present in relatively small amounts, which have been found generally desirable, these substances will dissolve completely in butane, but if present in relatively high proportion some gas may remain undissolved. Said undissolved gas may be discharged from condensing and separating zone 34 through line 35 to storage or to other use, while the mixture of butanes containing dissolved hydrogen and hydrogen chloride may be commingled in line 2 with a butene-containing fraction such as a butane-butene mixture, or any other suitable source of olefins, admitted through line 1 as hereinabove set forth. The alkylating step of the process is preferably operated under a pressure sufficient to maintain in solution a substantial proportion of the hydrogen present.

It is necessary to prevent excessive accumulation of propane and lighter hydrocarbons in the substantially butane mixture being subjected to isomerization and alkylation treatments. Such depropanization is carried out by subjecting to depropanization a part of the overhead condensate being conducted from debutanizing zone 9 through line 11 to isomerizing zone 25. Thus a third portion of the overhead condensate is passed from line 11 through line 36 to depropanizing zone 37 which comprises a fractional distilling column by which butanes are separated from lower boiling materials such as a mixture of propane, hydrogen, and hydrogen chloride. Said mixture is discharged from depropanizing zone 37 through line 38 while the butanes are returned from depropanizing zone 37 through line 39 to line 21 and are thence conducted to further separating, alkylating, and/or isomerizing treatment.

Thus only the hydrogen chloride contained in the relatively small depropanizer charge will be lost from the process while that contained in the material recycled directly to alkylation, isomerization and/or to separation into isobutane and normal butane will be available in the isomerizing and alkylating steps already mentioned.

Alternatively a portion of the overhead condensate may be discharged from the system through line 11 and branch line 40 thus simultaneously eliminating accumulation of propane and excess butanes. This alternative method of disposing of propane avoids the operation of two distilling columns but has the disadvantage that the loss of hydrogen chloride is considerable and that the butane withdrawn from the process contains a substantial proportion of isobutane.

The process of this invention may thus be used for converting a butane-butene fraction or individual butanes and butenes derived from any source into substantial yields of substantially saturated hydrocarbons of gasoline boiling range and high octane number.

The following specific example is introduced as representative of results expected from the process hereinabove described, although with no intention of unduly limiting the generally broad scope of the invention:

100 volumes of a butane-butene fraction containing approximately 10 mole per cent isobutene, 32% normal butene, 18% isobutane, and 40% normal butane is commingled with approximately 250 volumes of a total butane mixture both that formed and recycled in the process and containing approximately 85% isobutane and 15% normal butane. The resulting commingled mixture containing approximately 2.9% isobutene, 9.1% normal butene, 66.0% isobutane, 22.0% normal butane and small amounts of added hydrogen and hydrogen chloride is subjected to contact with sulfuric acid of 98% concentration at 45° F., under a pressure of 100 pounds per square inch to form a substantially saturated hydrocarbon fraction of gasoline boiling range with 93 octane number. With recycling of unconverted butanes, the ultimate yield of motor fuel corresponds to approximately 75% by weight of the originally charged butane-butene fraction.

A portion of the unconverted butane fraction containing hydrogen and hydrogen chloride is recycled to commingle with fresh butane-butene fraction being charged to alkylation while another portion is separated into normal butane and a lower boiling fraction comprising essentially isobutane, hydrogen, and hydrogen chloride. The latter fraction is recycled to alkylation while the normal butane fraction is subjected to isomerization in the presence of hydrogen, hydrogen chloride, and a composite of 33% by weight of aluminum chloride and 67% by weight of activated charcoal, said composite being utilized as a granular filler in a reactor maintained at a temperature of approximately 250° F., and under a pressure of approximately 250 pounds per square inch. The isomerization product generally consisting of approximately 67% isobutane and 33% normal butane is condensed under pressure to substantially absorb the desired amount of hydrogen chloride present and form a mixture for commingling with the butane-butene fraction being charged to alkylation.

The character of the process of the present invention and particularly its commercial value are evident from the preceding specification and example given, although neither section is intended to be unduly limiting in its generally broad scope.

I claim as my invention:

1. A process for the conversion of hydrocarbons which comprises subjecting a normal paraffin fraction to contact with a metal halide catalyst under isomerizing conditions of temperature and pressure and in the presence of hydrogen and hydrogen halide to form branched-chain paraffin, subjecting the resulting conversion products including said hydrogen and said hydrogen halide to cooling and condensation without substantial reduction of pressure to condense the branched-chain paraffin and unconverted normal paraffin and to dissolve a substantial portion of the hydrogen and hydrogen halide in the condensate, combining said condensate with an olefin-containing hydrocarbon fraction and subjecting the mixture to alkylation.

2. A process for the conversion of hydrocarbons which comprises subjecting a normal paraffin fraction to contact with a metal halide catalyst under isomerizing conditions of temperature and pressure and in the presence of hydrogen and hydrogen halide to form branched-chain paraffin, subjecting the resulting conversion products including said hydrogen and said hydrogen halide to cooling and condensation without substantial reduction of pressure to condense the branched-chain paraffin and unconverted normal paraffin and to dissolve a substantial portion of the hydrogen and hydrogen halide in the condensate, combining said condensate with an olefin-containing hydrocarbon fraction and subjecting the mixture to alkylation, fractionating the resulting alkylation products including the hydrogen and hydrogen halide to separate an alkylate from the remaining products of the alkylation treatment, and supplying at least a portion of the latter to the isomerizing step.

3. The process of claim 1 further characterized in that said normal paraffin comprises normal butane.

4. The process of claim 2 further characterized in that unconverted normal paraffin is separated from at least a portion of said remaining products, combined with another portion of said remaining products and supplied to the isomerizing step and branched-chain paraffin, hydrogen and hydrogen halide separated from the first mentioned portion is supplied to the alkylating step.

5. A process for the conversion of hydrocarbons which comprises subjecting a normal paraffin fraction to contact with a metal halide isomerizing catalyst under isomerizing conditions of temperature and pressure and in the presence of hydrogen halide to form branched-chain paraffins, subjecting the resulting conversion products including said hydrogen halide to cooling and condensation without substantial reduction of pressure to condense the same and dissolve in the resultant condensate a substantial portion of the hydrogen halide, combining the resultant condensate with an olefin-containing fraction and subjecting the mixture to alkylation.

6. A process for the conversion of hydrocarbons which comprises subjecting a normal paraffin fraction to contact with a metal halide isomerizing catalyst under isomerizing conditions of temperature and pressure and in the presence of hydrogen halide to form branched chain paraffins, subjecting the resulting conversion products including the hydrogen halide to cooling and condensation without substantial reduction of pressure to condense the branched-chain paraffin and unconverted normal paraffin and to dissolve in the resulting condensate at least a portion of the hydrogen halide, combining the resultant condensate with an olefin-containing fraction, subjecting the mixture to alkylation, separating normal paraffins and hydrogen halide from the remaining products of alkylation and supplying the normal paraffins and hydrogen halide to the isomerizing step.

7. A process for the conversion of hydrocarbons which comprises subjecting a normally gaseous mixture comprising isobutane, normal butane and butenes to alkylation, separating normal butane from the resultant conversion products, subjecting said normal butane to contact with a metal halide isomerizing catalyst under isomerizing conditions of temperature and pressure and in the presence of hydrogen halide to form additional isobutane, subjecting the products of the isomerizing treatment including the hydrogen halide to cooling and condensation without substantial reduction of pressure to condense the additional isobutane and unconverted normal butane and to dissolve at least a portion of the hydrogen halide in the resulting condensate and supplying the condensate thus formed to the alkylation step.

LOUIS S. KASSEL.